United States Patent
Kauschke et al.

(10) Patent No.: US 7,286,469 B2
(45) Date of Patent: Oct. 23, 2007

(54) NETWORK SYNCHRONIZATION DEVICE, SYSTEM AND METHOD

(75) Inventors: Michael Kauschke, Braunschweig (DE); Sebastian Steibl, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 10/621,809

(22) Filed: Jul. 17, 2003

(65) Prior Publication Data

US 2005/0013250 A1    Jan. 20, 2005

(51) Int. Cl.
H04J 1/16    (2006.01)
H04J 3/14    (2006.01)

(52) U.S. Cl. .................. 370/229; 370/236; 370/503

(58) Field of Classification Search .......... 370/229, 370/230.1, 235, 236, 503, 465, 466, 389, 370/401, 252; 709/230–237
See application file for complete search history.

(56) References Cited

U.S. PATENT DOCUMENTS

2005/0025083 A1* 2/2005 Murai et al. .............. 370/312
2005/0163149 A1* 7/2005 Unitt et al. ............... 370/442
2006/0182112 A1* 8/2006 Battle et al. .............. 370/392

OTHER PUBLICATIONS

IEEE Std. 802.3—2000, Clause 30.
IEEE Std. 802.3ae—2002, Clauses 45 and 50.

* cited by examiner

*Primary Examiner*—Ajit Patel
(74) *Attorney, Agent, or Firm*—Grossman, Tucker, Perreault & Pfleger, PLLC

(57) ABSTRACT

Described are a system, method and device to transmit data frames. A first port may transmit and receive data according to a packet based data transmission protocol at a first nominal data transmission rate and a second port may transmit and receive data according to a stream based data transmission protocol at a second nominal data transmission rate. The second port may forward received data frames to the first port for transmission according to the packet based data transmission protocol. A pause request frame generator may periodically insert a pause request frame among the forwarded data frames on a set period based, at least in part, on a difference between the first and second nominal data transmission rates.

23 Claims, 2 Drawing Sheets

NETWORK SYNCHRONIZATION DEVICE, SYSTEM AND METHOD

BACKGROUND

1. Field:

The subject matter disclosed herein relates to data transmission systems. In particular, the subject matter disclosed herein relates to the transmission of data frames in data links.

2. Information:

Local area networks (LANs) have enabled enterprises to operate data communication networks enabling devices such as personal computers, printers, data servers and the like to exchange data over a locally maintained transmission medium. Data links to couple these devices in a LAN typically transmit data between devices according any one of several Ethernet protocols provided in versions of IEEE Std. 802.3. Wide area networks (WAN) have enabled enterprises to couple LANs at different geographical sites to communicate by coupling the LANs by one or more high-speed data links. Such high-speed data links may be provided by a data communication service provider such as a telecommunication service provider. These high speed data links are typically part of a network backbone and formed according to the "Synchronous Optical NETwork" (SO-NET) protocol as indicated in a set of standards provided by the American National Standards Institute (ANSI T 1.105.xx) or "Synchronous Digital Hierarchy" (SDH) protocol as indicated in a set of recommendations provided by the International Telecommunications Union (e.g., ITU-T G.707, G. 708, G.709, G.783 and G.784).

In transmitting data between LANs, SONET links may encapsulate Ethernet frames in SONET for transmission between access ports on respective LANs. For example, an access port on a LAN may be adapted to transmit and receive data frames at a data rate of about 10 gigabits per second according to the 10 Gigabit Ethernet standard as provided in IEEE Std. 802.3ae-2002. The access port may then be coupled to a SONET link provisioned to provide data rate of about OC-192 capable of transmitting the encapsulated data frames at a data rate of about 9.5 gigabits per second.

FIG. 1 shows schematic diagram of a prior art access port 10 to initiate transmission of a pause request frames to a data source in response to the contents of a transmit buffer 12. On a LAN side, media access controllers 18 control the transmission of Ethernet frames to a WAN. Coupled to the WAN are a data transmitter 14 to transmit Ethernet frames encapsulated in SONET frames and a data receiver 16 to receive Ethernet frames capsulated in SONET frames. The data transmitter 14 and data receiver 16 each comprise an Ethernet MAC and a WAN interface sublayer (WIS) to encapsulate Ethernet frames in and de-encapsulate Ethernet frames from SONET frames as provided in IEEE Std. 802.3ae-2002, clause 50.

To prevent egress traffic from the LAN from overrunning the WAN's capacity to transmit data, a transmit buffer 12 may store Ethernet frames for transmission to the WAN. A flow control device 22 may also transmit a pause frame request to the LAN to request suspending the transmission of Ethernet frames for a predetermined period in response to the transmit buffer being full. Such a pause frame request may be provided as provided in IEEE Std. 802.3-2000, Clause 30.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
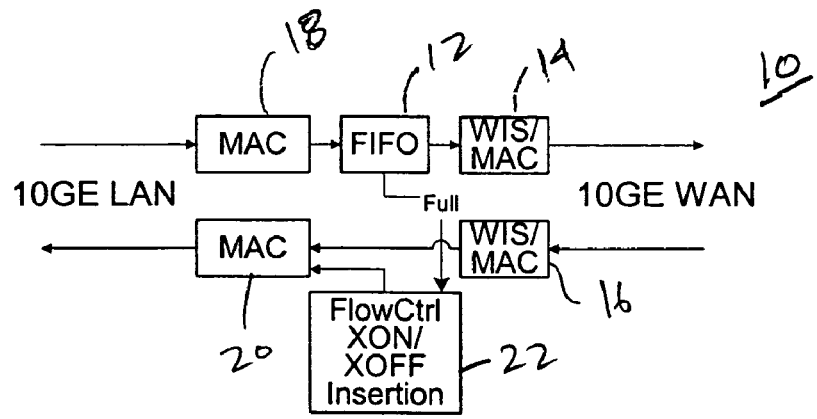
FIG. 1 shows schematic diagram of a prior art device to initiate the transmission pause request frames to a data source in response to the contents of a transmit buffer.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions or data. Such storage devices may comprise storage media such as, for example, optical, magnetic or semiconductor storage media. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments of the present invention are not limited in this respect.

A "data frame" or "frame" as referred to herein relates to a segment of data which is formatted for transmission from a source to a destination. A data frame may comprise a header portion and a payload portion. According to any particular data transmission protocol, a data frame may be defined as having a fixed length or variable length. However, these are merely examples of a data frame and embodiments of the present invention are not limited in these respects.

A "node" as referred to herein relates to a physical location in a communication network. Nodes in a communication network may be coupled by one or more "data links" which are capable of transmitting data between coupled nodes. A node may be associated with source or destination for data frames. However, these are merely examples of a node and embodiments of the present invention are not limited in these respects.

A "data transmission protocol" as referred to herein relates to a convention or format by which data may be transmitted in a data link. For example, a data transmission protocol may define any one of several conventions defining how data may be transmitted between nodes including, for example, encoding of data in signals transmitted in a physical transmission medium or a data frame format. However, these are merely examples of how a data transmission protocol may be characterized and embodiments of the present invention are not limited in these respects.

A "packet based" data transmission protocol as referred to herein relates to data transmission protocol for transmitting data through a data link when such data is available for transmission. For example, using a packet based data transmission protocol, a node may transmit data frames in a data link from a frame queue when there are data frames in the queue and suspend the transmission of data in the data link when the frame queue is empty. However, this is merely an example of a packet based data transmission protocol and embodiments of the present invention are not limited in these respects.

A "stream based" data transmission protocol as referred to herein relates to a data transmission protocol for continuously transmitting data through a data link independently of whether data is available for transmission. For example, using a stream based data transmission protocol, a node may transmit data frames or cells in a data link at set frame or cell intervals regardless of whether data is available for transmission. In the absence of data available for transmission, the node may transmit blank or pause frames. However, these are merely examples of a stream based data transmission protocol and embodiments of the present invention are not limited in these respects.

A "nominal data transmission rate" as referred to herein relates to a rate at which data may be transmitted in a data link using a particular data transmission protocol. In packet based data transmission protocol, for example, a nominal data transmission rate may characterize a rate at which a data frame may be transmitted through a data link. In a stream based data transmission protocol, a nominal data transmission rate may characterize a rate at which data may be continuously transmitted through a data link. However, these are merely examples of a nominal data transmission rate and embodiments of the present invention are not limited in these respects.

A "media access controller" (MAC) as referred to herein relates to a device to control the transmission of data frames to, or receipt of data frames from a data transmission medium. For example, a MAC may control the transmission of a data frame to a node in a data link or control the receipt of a data frame from a data link. However, this is merely an example of a MAC and embodiments of the present invention are not limited in this respect.

An "Ethernet frame" as referred to herein relates a data frame that is formatted for transmission in a data link according to any one of several data transmission protocols defined in IEEE Std. 802.3. For example, an Ethernet frame may comprise a data field to identify a MAC address associated with a destination for the Ethernet frame. However, this is merely an example of an Ethernet frame and embodiments of the present invention are not limited in this respect.

A "pause request frame" as referred to herein relates to a data frame indicating a request to temporarily suspend the transmission of data from a source for a pause period. For example, a MAC may transmit a pause request frame to a data frame source to request a suspension in the transmission of data from the data source to the MAC. However, this is merely an example of a pause request frame and embodiments of the present invention are not limited in this respect.

Briefly, an embodiment of the present invention relates to a system, method and device to transmit data frames. A first port may transmit and receive data according to a packet based data transmission protocol at a first nominal data transmission rate and a second port may transmit and receive data according to a stream based data transmission protocol at a second nominal data transmission rate. The second port may forward received data frames to the first port for transmission according to the packet based data transmission protocol. A pause request frame generator may periodically insert a pause request frame among the forwarded data frames on a set period based, at least in part, on a difference between the first and second nominal data transmission rates. However, this is merely an exemplary embodiment and other embodiments of the present invention are not limited in these respects.

Figure 2:
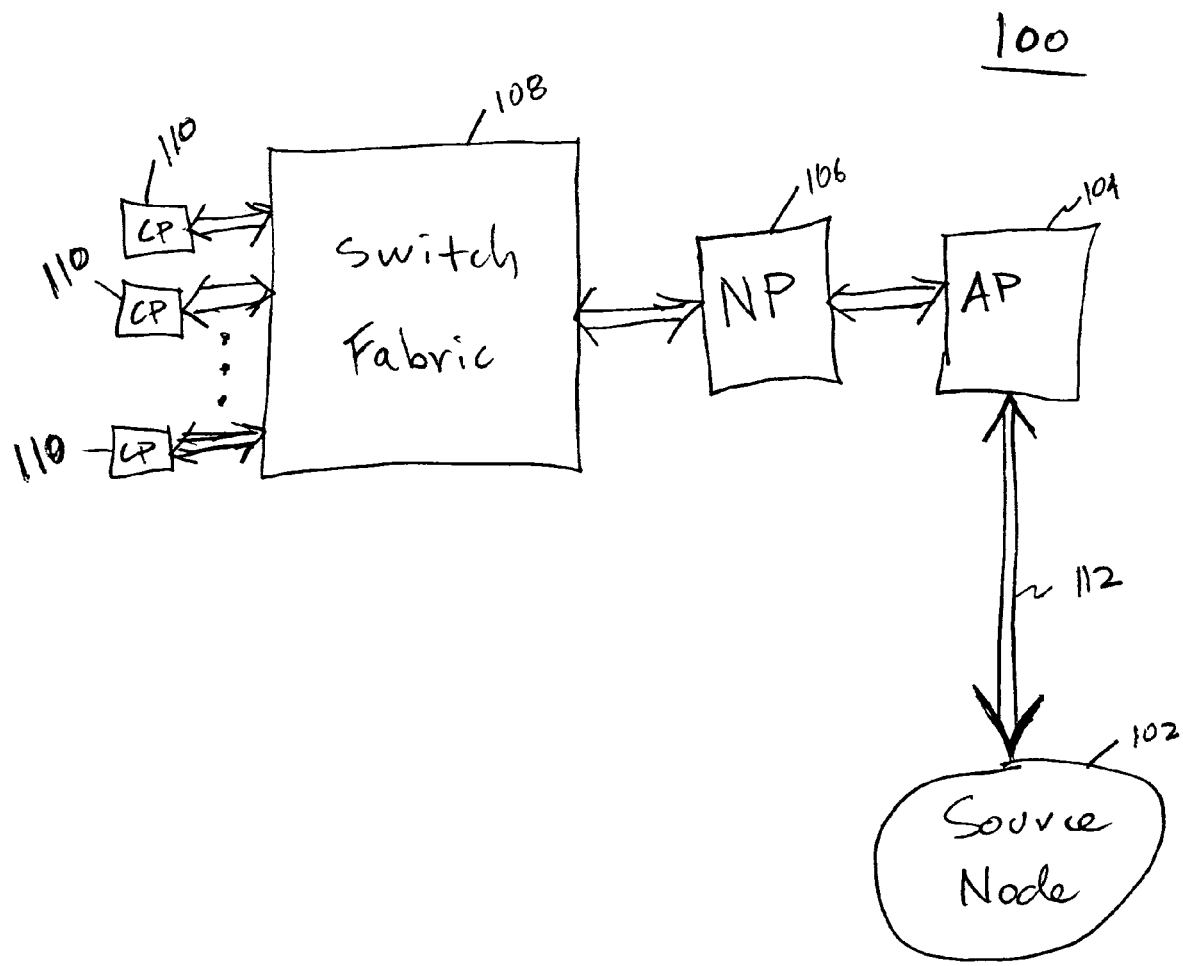
FIG. 2 shows a schematic diagram of a system to transmit data between a source node and client ports according to an embodiment of the present invention.

FIG. 2 shows a schematic diagram of a system 100 to transmit data between a source node 102 and client ports 110 according to an embodiment of the present invention. An access port 104 is coupled to the source node 102 by a data link 112. Data received by the access port 104 from the data link 112 may be processed by a network processing device 106 before being forwarded to a destination client port 110 through a switch fabric 108. Similarly, the access port 104 may forward data originating at a client port 110 to the source node 102.

The network processing device 106 may comprise one or more devices to perform packet processing operations such as packet classification and forwarding. The network processing device 106 may comprise any combination of an ASIC or programmable network processor device. Among other tasks, the network processing device may perform TCP/IP processing, encryption/decryption or firewall tasks such as intrusion detection. However, these are merely examples of tasks that may be performed by a network processing device and embodiments of the present invention are not limited in these respects.

According to an embodiment, data frames may be transmitted between the access port 104 and the client ports 108 according to a packet based data transmission protocol such as an Ethernet protocol. In one example, the access port 104 may transmit Ethernet frames to the network processing device 106 and the network processing device 106 may forward data packets in Ethernet frames to destination client ports 108. Similarly, the network processing device 106 may forward outgoing data packets in Ethernet frames to the access port 104. In other embodiments, the access port 104 and network processing device 106 may exchange data using other packet based data transmission protocols such as Fibrechannel or FDDI. However, these are merely examples of a packet based data transmission protocol and embodiments of the present invention are not limited in these respects.

According to an embodiment, the data link 112 may comprise any one of several transmission mediums such as, for example, fiber optic, coaxial or unshielded twisted pair cabling. The data link 112 may also enable full-duplex signaling data transmission to enable the access port 104 to transmit data to the source node 102 in an upstream data path and enable the source node 102 to transmit data to the access port 104 in a downstream data path. In one embodiment, the data link 112 may transmit data between nodes according to a stream based data transmission protocol such as a SONET protocol. In this example, the data link 112 may be provisioned according to a defined data transmission format such as, for example, OC-48, OC-192, OC-768 or the like. In other embodiments, the data link 112 may transmit data according to other stream based data transmission protocols such as, for example, an Optical Transport Network (OTN) protocol, Asynchronous Transfer Mode (ATM) protocol or generic framing procedure (GFP) protocol. However, these are merely examples of a data link that may enable an access port and source node to exchange data using a stream based data transmission protocol and embodiments of the present invention are not limited in these respects.

Figure 3:
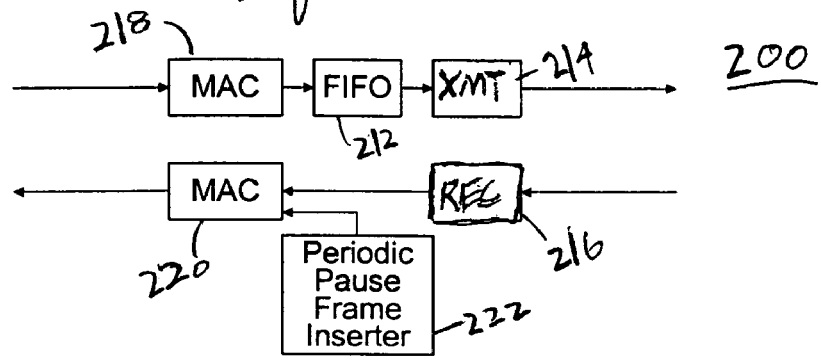
FIG. 3 shows a schematic diagram of an access port to periodically insert pause frames among received data according to an embodiment of the access port shown in FIG. 2.

FIG. 3 shows a schematic diagram of an access port 200 according to an embodiment of the access port 104 shown in FIG. 2. A MAC 220 may control the transmission of frames according to a packet based data transmission protocol based upon data received according to a stream based transmission protocol (from the data link 112, FIG. 2). A MAC 218 may control the forwarding of data received according to the packet based data transmission protocol to the data link 112. While MACs 218 and 220 are shown as distinct devices, it should be understood that, in some embodiments, the MACs 218 and 220 may be formed in a single MAC device.

Coupled to the data link 112 are a data transmitter 214 to transmit data according to the stream based data transmission protocol while a data receiver 216 may receive data according the stream based data transmission protocol. While the data transmitter 214 and data receiver 216 are shown as distinct devices, it should be understood that, in some embodiments, the data transmitter 214 and data receiver 216 may be formed in a single data transceiver.

In one embodiment, the data transmitter 214 and data receiver 216 comprise an Ethernet MAC and a WAN interface sublayer (WIS) to encapsulate Ethernet frames in and de-encapsulate Ethernet frames from SONET frames as provided in IEEE Std. 802.3ae-2002, clause 50. In other embodiments, however, the data transmitter 214 and data receiver 216 may be adapted to transmit and receive data according to other stream based data transmission protocols such as, for example, OTN, ATM or GFP protocols. However, these are merely examples of stream based data transmission protocols that may be used to transmit or received data from a network employing a packet based data transmission protocol, and embodiments of the present invention are not limited in these respects. Also, in other embodiments, the MACs 218 and 220 may be adapted to transmit and receive data according to other packet based data transmission protocols such as Fibrechannel and FDDI. Again, these are merely examples of packet based data transmission protocols that may be used to transmit or receive data and embodiments of the present invention are not limited in these respects.

According to an embodiment, the MAC 218 may be capable of transmitting data on the data link 112 at a data rate that exceeds the data transmission capacity of the of data link 112. To prevent egress traffic from the MAC 218 from overrunning the capacity of the data link 112 capacity to transmit data, a transmit buffer 212 may store data frames for transmission to the link. A pause request frame generator 222 may also insert a pause request frame among data forwarded to the MAC 220 requesting suspension of the transmission of data frames (from the MAC 218) for a predetermined pause duration. Such a pause frame request may specify a duration of a requested pause and be provided as described in IEEE Std. 802.3-2000, Clause 30. However, this is merely an example of how a pause request frame may be generated for embodiments employing a packet based protocol according to an Ethernet protocol, and embodiments (e.g., using other packet based data transmission protocols) of the present invention are not limited in these respects.

According to an embodiment, the pause request frame generator 222 may periodically transmit a pause request frames on a predetermined period which is based, at least in part, on a length of the predetermined pause duration and a difference between the nominal data transmission rates associated with the MAC 218 and the data transmitter 214. Both the length of the predetermined pause duration and length of the predetermined period may be selected based upon the difference between these nominal data transmission rates as follows:

_=k×_/(ndtr$_1$−ndtr$_2$)
_=_×(ndtr$_1$−ndtr$_2$)/k where:
i. ndtr$_1$=nominal data transmission rate associated with the MAC 218
ii. ndtr$_2$=nominal data transmission rate associated with data link 112
iii. _=the length of the predetermined period
iv. _=the length of the predetermined pause duration
v. k=a proportionality constant In one particular example, the MAC 218 may be capable of transmitting Ethernet frames at a nominal data transmission rate of 10 gigabits per second. The data transmitter 214 may be provisioned to transmit the data from the Ethernet frames in SONET frames in an OC-192 data link at a nominal data rate of about 9.5 gigabits per second. The data transmitter 214 may also comprise an Ethernet MAC and a WIS circuit to encapsulate Ethernet frames for transmission in the SONET frames. To prevent the MAC 218 from overrunning the data transmitter 214, the pause request frame generator 222 may periodically insert pause request frames in data frames forwarded to the MAC 220. Here, the pause request frame generator 222 may be programmed to periodically generate pauses to offset the 500 Mbps difference in the nominal data rates. For example, the length of the predetermined period _ and the length of the predetermined pause duration _ may be determined as follows:

_=k×_/(500 Mbps)
_=_×(500 Mbps)/k

Assuming that k=1, the length of the predetermined period _ may be 100 msec. the predetermined pause duration _ may be 5.0 msec. Similarly, the length of the predetermined period _ may be 50 msec while _ may be 2.5 msec. However, these are merely examples of a predetermined period _ and predetermined pause duration _ that may be chosen to offset a difference in nominal data transmission rates, and embodiments of the present invention are not limited in these respects.

According to an embodiment, the pause request frame generator 222 may generate pause request frames in between data frames which are forwarded from the data receiver 216 to the MAC 220 while not delaying the forwarding of data frames from the data receiver 216. Thus, the pause request frame generator 222 may not be able to initiate pause request frames on exactly the predetermined period _. To prevent temporary overrunning of the data transmitter 214 when a pause request frame is provided to the MAC 220 late (e.g., the insertion of consecutive pause request frame extends beyond the predetermined period _) the transmit buffer 212 may be appropriately sized to store an appropriate number of data frames (e.g., at least two data frames). However, this is merely an example of how the transmit buffer 212 may be sized to account for late pause request frames and embodiments of the present invention are not limited in this respect.

Figure 4:
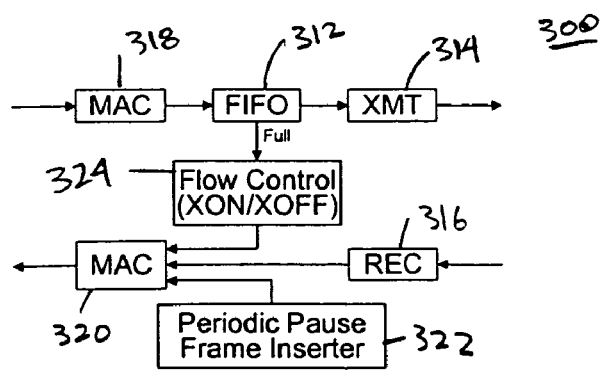
FIG. 4 shows a schematic diagram of an access port to periodically insert pause frames among received data in combination with flow control based upon transmit buffer status according to an alternative embodiment of the access port shown in FIG. 2.

FIG. 4 shows a schematic diagram of an access port 300 to according to an alternative embodiment of the access port 104 shown in FIG. 2. A MAC 320 may control the transmission of frames according to a packet based data transmission protocol based upon data received according to a stream based data transmission protocol. A MAC 318 may control the forwarding of data received according to the packet based data transmission protocol to the data link 112. The port 300 may transmit data to and receive data from the data link 112 according to a stream based data transmission protocol via data transmitter 314 and data receiver 316.

According to an embodiment, a periodic pause frame generator 322 may periodically insert pause frames on a predetermined period as described above in connection with the periodic pause frame generator 222 shown in FIG. 3. In addition, however, a flow control device 324 may initiate transmission of a pause request frame to suspend the transmission of frames from the MAC 320 in response to an indication that the buffer 312 is full. In this embodiment, the periodic pause frame generator 322 may compensate for a major portion of the known difference in nominal data rates between the data link 112 and the MAC 318. A remaining unknown or time varying portion of this difference in nominal data rates may be addressed using the flow control device 324. For example, the buffer 312 may be extended in size (over sizing for buffer 212 as discussed above) by an amount given by the product of the maximum turn around between the MACs 318 and 320, and a maximum data rate gap.

According to alternative embodiments of the access ports shown in FIGS. 3 and 4, the pause request frame generators 222 and 322 may be programmed to provide pause request frames which request pauses of a predetermined duration. The pause request frame generators 222 and 322 may also be programmable to generate the pause requests at a predetermined period or frequency. In one example, a pause request frame generator may receive signals from a Management Data Input/Output ("MDIO") Interface (not shown) as provided in clause 45 of the 10 Gigabit Ethernet Specification to receive control signals. An optical transceiver coupled to the data link 112 may comprise a Management Data Input/Output ("MDIO") Interface as provided in clause 45 of the 10 Gigabit Ethernet Specification to receive control signals. However, this is merely an example of how a pause frame generator may be programmed to generate pause request frames and embodiments of the present invention are not limited in these respects.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   an access port adapted to be coupled to a source node through a data link; and
   a plurality of client ports coupled to transmit data frames to and receive data frames from the access port,
   wherein the access port further comprises:
   a first port to transmit and receive data according to a packet based data transmission protocol at a first nominal data transmission rate;
   a second port to transmit and receive data according to a stream based data transmission protocol at a second nominal data transmission rate, the second port forwarding received data frames to the first port for transmission according to the packet based data transmission protocol; and
   a pause request frame generator to periodically insert a pause request frame among the forwarded data frames on a set period based, at least in part on a length of the predetermined pause duration and, on a difference between the first and second nominal data transmission rates.

2. The system of claim 1, the system further comprising a switch fabric coupled between the access port and the client ports.

3. The system of claim 2, the system further comprising a network processing device coupled between the access port and the switch fabric to process at least a portion of the forwarded data frames.

4. The system of claim 3, wherein the network processing device comprises logic to determine a destination client port of at least some of the forwarded data frames based, at least in part, on an Internet Protocol address in the forwarded data frames.

5. The apparatus of claim 1, wherein the first nominal data transmission exceeds the second nominal data transmission rate.

6. The apparatus of claim 5, wherein the pause request frame specifies a pause duration, and wherein a product of the pause duration and the set period are substantially proportional to a difference between the first and second nominal data transmission rates.

7. The apparatus of claim 5, wherein the first port comprises a MAC to transmit and receive data frames according to an Ethernet protocol.

8. The apparatus of claim 7, wherein the second port comprises a WAN interface sublayer circuit to transmit and receive data frames according to a SONET protocol.

9. The apparatus of claim 7, wherein the second port comprises a circuit to transmit and receive data according to an asynchronous transmit mode (ATM).

10. The apparatus of claim 7, wherein the second port comprises a circuit to transmit and receive data according to an OTN protocol.

11. The apparatus of claim 7, wherein at least one of the of the pause duration and the set period are programmable via a Management Data Input/Output Interface.

12. An apparatus comprising:
 a first port to transmit and receive data according to a packet based data transmission protocol at a first nominal data transmission rate;
 a second port to transmit and receive data according to a stream based data transmission protocol at a second nominal data transmission rate, the second port forwarding received data frames to the first port for transmission according to the packet based data transmission protocol; and
 a pause request frame generator to periodically insert a pause request frame among the forwarded data frames on a set period based, at least in part on a length of the predetermined pause duration and, on a difference between the first and second nominal data transmission rates.

13. The apparatus of claim 12, wherein the first nominal data transmission exceeds the second nominal data transmission rate.

14. The apparatus of claim 13, wherein the pause request frame specifies a pause duration, and wherein a product of the pause duration and the set period are substantially proportional to a difference between the first and second nominal data transmission rates.

15. The apparatus of claim 13, wherein the first port comprises a MAC to transmit and receive data frames according to an Ethernet protocol.

16. The apparatus of claim 15, wherein the second port comprises a WAN interface sublayer circuit to transmit and receive data frames according to a SONET protocol.

17. The apparatus of claim 15, wherein the second port comprises a circuit to transmit and receive data according to an asynchronous transmit mode (ATM).

18. The apparatus of claim 15, wherein the second port comprises a circuit to transmit and receive data according to an OTN protocol.

19. The apparatus of claim 15, wherein at least one of the of the pause duration and the set period are programmable via a Management Data Input/Output Interface.

20. A method comprising:
 receiving egress data according to a packet based data transmission protocol at a first nominal data transmission rate;
 transmitting the received egress data according to a stream based data transmission protocol at a second nominal data transmission rate;
 forwarding ingress data for transmission according to the packet based data transmission protocol; and
 periodically inserting a pause request frame among the forwarded data on a set period based, at least in part on a length of the predetermined pause duration and, on a difference between the first and second nominal data transmission rates.

21. The method of claim 20, the method further comprising receiving the ingress data according to the stream based data transmission protocol.

22. The method of claim 21, the method further comprising buffering ingress data frames prior to transmission according to the second data transmission protocol.

23. The method of claim 20, wherein receiving the egress data comprises receiving data frames data frames according to a 10 Gigabit Ethernet standard, and wherein transmitting the transmitting the egress data further comprises transmitting the egress data in SONET frames according to OC-192.

* * * * *